(12) United States Patent
Fink

(10) Patent No.: US 7,265,955 B2
(45) Date of Patent: Sep. 4, 2007

(54) PROTECTIVE CIRCUIT FOR ANALOG SENSORS

(75) Inventor: Alexander Fink, Munich (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 105 days.

(21) Appl. No.: 10/532,589

(22) PCT Filed: Oct. 23, 2003

(86) PCT No.: PCT/EP03/11742

§ 371 (c)(1),
(2), (4) Date: Nov. 16, 2005

(87) PCT Pub. No.: WO2004/038882

PCT Pub. Date: May 6, 2004

(65) Prior Publication Data

US 2006/0114626 A1    Jun. 1, 2006

(30) Foreign Application Priority Data

Oct. 24, 2002  (DE) ............................... 102 49 599

(51) Int. Cl.
*H02H 3/00*    (2006.01)
*H02H 9/08*    (2006.01)
(52) U.S. Cl. .......................... 361/42; 361/86; 361/88
(58) Field of Classification Search ................. 361/42, 361/49, 93.7, 98, 58, 101, 86, 88
See application file for complete search history.

(56) References Cited

U.S. PATENT DOCUMENTS

| | | | |
|---|---|---|---|
| 3,684,924 A * | 8/1972 | Miller, Jr. ..................... 361/58 |
| 4,808,839 A * | 2/1989 | Dunn et al. .................. 327/546 |
| 5,294,890 A | 3/1994 | Hemminger et al. | |
| 5,418,673 A * | 5/1995 | Wong ........................... 361/18 |
| 5,422,568 A | 6/1995 | Hashizume et al. | |
| 5,508,872 A | 4/1996 | Khoo et al. | |
| 6,246,557 B1 * | 6/2001 | Bayer et al. .................. 361/42 |
| 6,560,079 B1 * | 5/2003 | Hirsh et al. ................... 361/42 |

FOREIGN PATENT DOCUMENTS

| | | |
|---|---|---|
| DE | 41 18 718 A1 | 12/1992 |
| DE | 43 16 636 A1 | 11/1993 |
| IT | EP0519156 A1 * | 10/1992 |

OTHER PUBLICATIONS

German Office Action dated Jan. 9, 2007 with English translation (nine (9) pages).

* cited by examiner

*Primary Examiner*—Brian Sircus
*Assistant Examiner*—Z Kitov
(74) *Attorney, Agent, or Firm*—Crowell & Moring LLP

(57) ABSTRACT

The protective circuit for analog sensors has transistors respectively located in a power supply voltage line and in a ground line. The control electrode of said circuit is located between the supply voltage and the ground via a voltage divider. The sensor output line is connected to the ground potential of the control device via a pull-down resistor. During normal operation, both transistors are connected. Both transistors switch off when the ground line is disconnected. This prevents a current from flowing to the sensor output line via the power supply voltage line, the voltage divider or via the sensor. The sensor output line is, in fact, pulled to the ground potential by the pull-down resistor. This prevents the appearance of a defective signal that could emulate a wanted signal.

8 Claims, 1 Drawing Sheet

PROTECTIVE CIRCUIT FOR ANALOG SENSORS

BACKGROUND AND SUMMARY OF THE INVENTION

The invention relates to a protective circuit for analog sensors, which have a power supply connection, a chassis ground connection and a sensor output connection. Such sensors are generally known and are used, for example, as pressure sensors in motor vehicles.

Specifically, in the case of motor vehicles, one of the electrical lines to the sensor may be interrupted by shocks or similar disturbing influences, either as a result of a line break, the detaching of a plug-type connection, or similar occurrences. An interruption of the ground line is particularly critical because supply voltage continues to be present on the supply voltage line and, as a result, a faulty signal can occur at the sensor output, which faulty signal cannot be differentiated from valid measured values. This can, for example, have the result that, when the ground line is interrupted, a normal operating condition (for example, a sufficient operating pressure of the braking system in the case of commercial vehicles) is indicated in the control unit, although it does not exist. This represents a considerable safety risk.

Thus, in the event of an interruption of the ground line to the sensor, the currently known analog sensors supply a measuring signal to the control unit which differs from zero. In the event of a fault, the signal voltage detected in the control unit depends considerably on the load resistance. It is therefore an object of the invention to create a protective circuit for analog sensors of the above-mentioned type which, in the event of a line interruption, particularly in the event of an interruption of the ground line, supplies a signal which can be clearly distinguished from a wanted signal.

This object is achieved by providing a protective circuit for analog sensors which are connected with a supply voltage line, a ground line and a sensor output line. One transistor, respectively, is interposed in the supply voltage line and the ground line, whose control connection is connected to one voltage divider respectively situated between the supply voltage line and the ground line. The two transistors are connected in the normal operation and are switched off at least when the ground line is interrupted. The sensor output line is connected by way of a pull-down resistor with a ground potential, which is independent of the ground line. Advantageous developments and further developments of the invention are described and claimed herein.

The basic principle of the invention consists of interposing one transistor, respectively, in the sensor in the ground line and the supply voltage line, whose control connection is coupled to voltage dividers, which are situated between the supply line and the ground line. The two transistors are switched through (on) in the normal operation and are switched off at least when the ground line is interrupted. The sensor output line is loaded/terminated by way of a pull-down resistor in the control unit and pulls the signal in the event of a fault into a secure condition (GND potential).

As a result, it is achieved that, in the event of the interruption of one of the connection lines of the analog sensor, it is ensured that the signal voltage measured, for example, in a control unit (thus the voltage at the sensor output line) becomes exactly zero, which easily demonstrates a malfunctioning of the sensor.

In the following, the invention will be explained in greater detail by means of an embodiment in connection with the drawing.

DETAILED DESCRIPTION OF THE DRAWING

Figure 1:
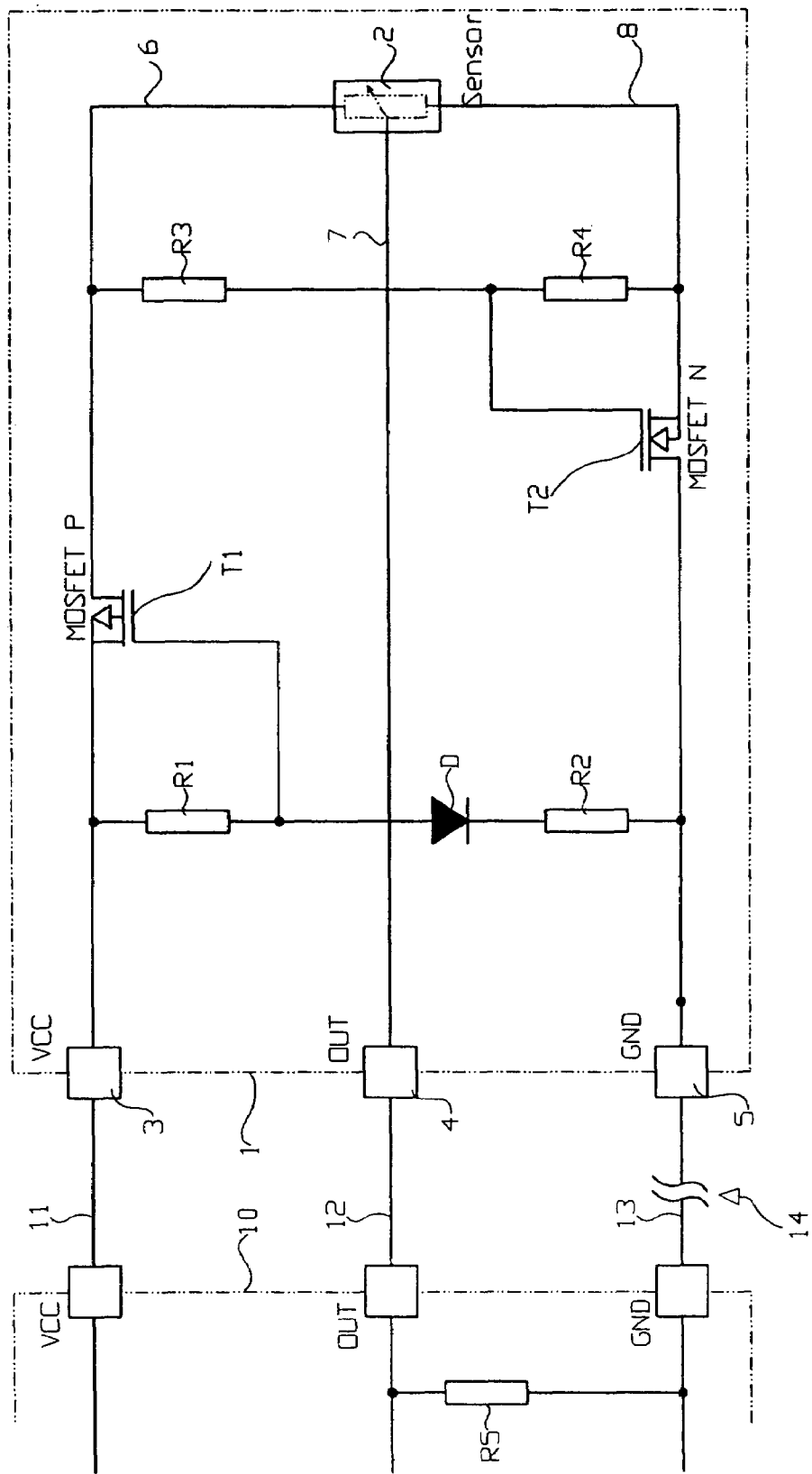
FIG. 1 is a circuit diagram of an embodiment of the monitoring circuit according to the invention.

A sensor 2 and the monitoring circuit described in the following are arranged in a sensor housing 1. In the illustrated embodiment, the sensor is an analog sensor whose output in the control unit is loaded by the pull-down load resistor, as schematically illustrated in FIG. 1 by the resistor R5. Three inputs exist at the sensor housing, specifically an input 3 for the supply voltage (VCC), a connection 4 for a sensor output signal (OUT) and a connection 5 for the ground (GND). These inputs are connected with the assigned connections of the control unit 10, which takes place by way of lines 11, 12 and 13. By way of lines 6, 7 and 8 respectively, the three connections are connected with the sensor 2. A transistor T1, which is a MOSFET transistor of the p-type, is connected in the voltage supply line 6. Correspondingly, a second transistor T2, which is a MOSFET transistor of the n type, is connected in the ground line 8, the latter transistor being operated in an inverse manner.

A voltage divider consisting of a series connection of a first resistor R1, of a diode D connected in the transmitting direction, and of a second resistor R2 is situated between the voltage supply line 6 and the ground line 8. The connection point between the first resistor R1 and the diode D is connected with the gate electrode of the first transistor T1.

Further, a voltage divider of a series connection of a third resistor R3 and a fourth resistor R4 is situated between the supply voltage line 6 and the ground line 8. The connection point between the resistors R3 and R4 being connected with the gate electrode of the second transistor T2.

The resistor pairs R1/R2 and R3/R4 respectively act as voltage dividers which, in the normal condition, feed a voltage to the gate electrode of the transistors T1 and T2 respectively, which voltage results in the switching-through (on) of the transistors. In the normal operation, the transistor T2 is operated in an inverse manner. The parasitic diode between the drain connection and the source connection provides that a current can flow at the switch-on moment. Subsequently, the transistor is switched to low impedance by way of the gate voltage.

In the event of an interruption 14 of the ground line 13 to the sensor 2, the ground potential in the sensor is boosted by way of R1, D and R2. The transistors T1 and T2 then switch off. In this case, R1 and R2 have to be dimensioned in a relatively low-impedance manner in order to be able to boost the GND potential to such an extent against the resistance of the pull-down resistor R5 in the event of a fault that T1 switches off. The transistor T2 in this case carries out the objective of preventing a current flow of supply voltage (VCC) by way of R1, D, R2 and the sensor 2 to the output connection 4. The pull-down resistor R5 assigned to the sensor thereby pulls the output connection 4 of the sensor to the ground potential. Independently of the ground connection line 8, this pull-down resistor R5 is connected with the ground potential of the voltage supply in the control unit 10.

A break in the supply voltage line 6 is not critical because there will then be no danger anyhow that an incorrect signal reaches the output connection 4 by way of the sensor. In addition, in the event of a break in the supply voltage line, the two transistors T1 and T2 would also switch off so that the pull-down resistor R5 also pulls the output connection 4 of the sensor 2 to the ground potential.

A break in the sensor output line 12 (or 7) is also not critical because the pull-down resistor R5 then pulls the potential to GND. Since the sensor voltage is always measured by way of R5, it is expedient to house this pull-down resistor in the control unit 10. However, it would also be contemplated to house it in the sensor housing 1 on line 7. In this case, the other connection of the resistor R5 would have to be connected with the GND potential of the control unit 10, specifically such that also in the event of a break in the ground line 13, the GND potential is applied there, which would require another line. For this reason, the above-described arrangement in the control unit 10 is preferred.

The invention claimed is:

1. A protective circuit for an analog sensor coupled to a supply voltage line, a ground line and a sensor output line, the protective circuit comprising:
   a first transistor interposed in the supply voltage line;
   a second transistor interposed in the ground line;
   a control connection of each transistor being coupled to a respective voltage divider situated between the supply voltage line and the ground line;
   wherein the first and second transistors are switched through under normal operation and are switched-off at least when the ground line is interrupted; and
   a pull-down resistor coupling the sensor output line with a ground potential, which ground potential is independent of the ground line.

2. The protective circuit according to claim 1, further comprising:
   a housing in which the analog sensor is arranged;
   a control unit in which the pull-down resistor is arranged outside the housing of the analog sensor; and
   wherein the pull-down resistor is arranged between a measuring input and the ground potential of the control unit.

3. The protective circuit according to claim 1, wherein the first and second transistors are MOSFET transistors.

4. The protective circuit according to claim 2, wherein the first and second transistors are MOSFET transistors.

5. The protective circuit according to claim 3, wherein the second transistor is operated in an inverse manner.

6. The protective circuit according to claim 4, wherein the second transistor is operated in an inverse manner.

7. The protective circuit according to claim 1, further comprising:
   a diode switched in a transmitting direction from the supply voltage line to the ground line connected in the voltage divider to which the control connection of the first transistor interposed in the supply voltage line is connected.

8. The protective circuit according to claim 2, further comprising:
   a diode switched in a transmitting direction from the supply voltage line to the ground line connected in the voltage divider to which the control connection of the first transistor interposed in the supply voltage line is connected.

* * * * *